US011934568B2

(12) United States Patent
Haramaty et al.

(10) Patent No.: US 11,934,568 B2
(45) Date of Patent: Mar. 19, 2024

(54) CABLE SECURITY

(71) Applicant: MELLANOX TECHNOLOGIES TLV LTD., Raanana (IL)

(72) Inventors: Zachy Haramaty, Hemed (IL); Zvika Eyal, Nahariya (IL); Shachar Dor, Rosh Ha'ayin (IL); Liron Mula, Ramat Gan (IL); Barry Spinney, Wayland, MA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 286 days.

(21) Appl. No.: 17/115,832

(22) Filed: Dec. 9, 2020

(65) Prior Publication Data

US 2021/0182441 A1    Jun. 17, 2021

Related U.S. Application Data

(60) Provisional application No. 62/947,000, filed on Dec. 12, 2019.

(51) Int. Cl.
*G06F 21/85* (2013.01)
*G06F 13/40* (2006.01)
(Continued)

(52) U.S. Cl.
CPC .......... *G06F 21/85* (2013.01); *G06F 13/4068* (2013.01); *G06F 21/73* (2013.01); *G06F 21/86* (2013.01); *G06F 2221/2103* (2013.01)

(58) Field of Classification Search
CPC ... G06F 21/85; G06F 21/73; G06F 2221/2103
See application file for complete search history.

(56) References Cited

U.S. PATENT DOCUMENTS

| 3,349,163 A | 10/1967 | Rocton |
| 3,816,673 A | 6/1974 | Miya |

(Continued)

FOREIGN PATENT DOCUMENTS

| CN | 1917098 A | 2/2007 |
| CN | 202404636 U | 8/2012 |

(Continued)

OTHER PUBLICATIONS

"SFF-8431 Specifications for Enhanced Small Form Factor Pluggable Model SFP+", Revision 4.1, pp. 1-132, Jul. 6, 2009.

(Continued)

*Primary Examiner* — Ellen Tran
(74) *Attorney, Agent, or Firm* — Kligler & Associates

(57) ABSTRACT

A device including a cable transceiver including cable electrical connections including data electrical connections and control electrical connections, and a hardware memory device, the hardware memory device storing a string identifying a cable and being electrically accessible from externally to the cable transceiver via the control electrical connections. The cable, in electrical connection with the cable electrical connections, may be included in the device. A device for verifying cable authenticity is also described, the device including interface hardware for interfacing a plurality of cables with the device, and verifier circuitry configured to verify that each of the plurality of cables is genuine based on a string stored in a hardware memory device included in each of the plurality of cables. Related apparatus and methods are also described.

18 Claims, 4 Drawing Sheets

(51) Int. Cl.
*G06F 21/73* (2013.01)
*G06F 21/86* (2013.01)

(56) References Cited

U.S. PATENT DOCUMENTS

| | | | |
|---|---|---|---|
| 4,767,173 | A | 8/1988 | Priaroggia |
| 5,412,716 | A | 5/1995 | Blaha |
| 5,876,239 | A | 3/1999 | Morin et al. |
| 6,449,258 | B1 | 9/2002 | Grammel |
| 6,975,242 | B2 | 12/2005 | Dannenmann et al. |
| 7,045,717 | B2 | 5/2006 | Kolvick et al. |
| 7,107,414 | B2 | 9/2006 | Hidai et al. |
| 7,260,302 | B2 | 8/2007 | Caveney |
| 7,321,313 | B1 | 1/2008 | Inlow |
| 7,346,586 | B1 | 3/2008 | Walmsley |
| 7,760,094 | B1 | 7/2010 | Kozischek et al. |
| 8,010,999 | B2 | 8/2011 | Fujita et al. |
| 8,184,933 | B1 * | 5/2012 | Aybay ................ G02B 6/3895 385/100 |
| 8,903,683 | B2 | 12/2014 | Shilo et al. |
| 9,111,466 | B2 | 8/2015 | Por et al. |
| 9,735,514 | B2 | 8/2017 | Salloum et al. |
| 9,749,009 | B2 | 8/2017 | Shilo et al. |
| 10,628,639 | B1 * | 4/2020 | Lai ........................ G01R 31/11 |
| 2004/0065470 | A1 | 4/2004 | Goodison et al. |
| 2004/0065741 | A1 | 4/2004 | Reddersen et al. |
| 2004/0118925 | A1 | 6/2004 | Kelly et al. |
| 2005/0049979 | A1 | 3/2005 | Collins et al. |
| 2005/0210043 | A1 | 9/2005 | Manasse |
| 2007/0004241 | A1 | 1/2007 | Meier et al. |
| 2008/0031576 | A1 | 2/2008 | Hudgins |
| 2008/0172722 | A1 | 7/2008 | Fujita |
| 2008/0314979 | A1 | 12/2008 | Johnsen et al. |
| 2008/0318465 | A1 | 12/2008 | Johnsen et al. |
| 2009/0269943 | A1 | 10/2009 | Palli et al. |
| 2010/0028014 | A1 | 2/2010 | Hosking |
| 2010/0054749 | A1 | 3/2010 | Hosking |
| 2010/0098412 | A1 | 4/2010 | Boyd et al. |
| 2010/0111476 | A1 | 5/2010 | Shirk et al. |
| 2010/0176962 | A1 | 7/2010 | Yossef |
| 2010/0238020 | A1 | 9/2010 | Pellen |
| 2010/0248720 | A1 | 9/2010 | Millet et al. |
| 2012/0187964 | A1 | 7/2012 | Michaelis et al. |
| 2013/0179548 | A1 | 7/2013 | Singh et al. |
| 2014/0105029 | A1 | 4/2014 | Jain et al. |
| 2014/0108786 | A1 * | 4/2014 | Kreft ................ G06Q 20/3825 713/194 |
| 2014/0173156 | A1 * | 6/2014 | Alshinnawi ............ G06F 13/36 710/305 |
| 2014/0201260 | A1 * | 7/2014 | Dor ...................... H01R 13/665 439/491 |
| 2014/0255036 | A1 * | 9/2014 | Jovicic ............... G07C 9/00309 398/115 |
| 2017/0006182 | A1 | 1/2017 | Marinkin et al. |
| 2017/0075699 | A1 * | 3/2017 | Narayanan ............ H04L 9/006 |
| 2018/0020000 | A1 * | 1/2018 | Rzezak ............ H04N 21/25841 |
| 2018/0048097 | A1 * | 2/2018 | Misgen .................... G01R 5/00 |
| 2019/0391946 | A1 * | 12/2019 | Yang ...................... H04L 41/12 |
| 2020/0059710 | A1 * | 2/2020 | Huang ................ H04B 10/502 |
| 2020/0074125 | A1 * | 3/2020 | Rein .................... G06K 7/0008 |
| 2020/0184784 | A1 * | 6/2020 | Sainath ................... G08B 5/22 |

FOREIGN PATENT DOCUMENTS

| | | |
|---|---|---|
| GB | 774026 A | 5/1957 |
| JP | 05161224 A2 | 6/1993 |
| JP | 2006271154 A | 10/2006 |
| JP | 2007140886 A | 6/2007 |
| WO | 9402913 A1 | 2/1994 |
| WO | 2010105993 A2 | 9/2010 |
| WO | 2017160843 A1 | 9/2017 |

OTHER PUBLICATIONS

"INF-8438i Specification for Quad Small Form-factor Pluggable (QSPF) Transceiver Specifications", Revision 1.0, pp. 1-75, Nov. 2006.

Tamanuki et al., "High Density Packaged 4-Channel Transceiver for Metro and Access Applications", IEEE Electronic Components and Technology Conference, pp. 1050-1057, year 2005.

Wikipedia, "Hardware security module," pp. 1-5, Oct. 31, 2020.

Wikipedia, "I²C," pp. 1-15, Feb. 15, 2020.

Wikipedia, "Management Data Input/Output," pp. 1-3, Feb. 12, 2020.

Wikipedia, "Trusted Platform Module," pp. 1-13, Oct. 5, 2020.

Wikipedia, "Birthday problem," pp. 1-11, Dec. 31, 2020.

Wikipedia, "Organizationally unique identifier," pp. 1-10, Sep. 23, 2020.

Etham et al., "A 128K EPROM Using Encryption of Pseudorandom Numbers to Enable Read Access," IEEE Journal of Solid-State Circuits, vol. SC-21, No. 5, pp. 881-888, Oct. 1986.

"SFF-8636—Specification for Management Interface for Cabled Environments," Revision 2.7, pp. 1-61, Jan. 26, 2016.

Nvidia Corporation, "BLUEFIELD-2 DPU", Datasheet, pp. 1-3, year 2020.

\* cited by examiner

CABLE SECURITY

RELATED APPLICATION INFORMATION

The present application claims the benefit of U.S. Provisional Patent Application Ser. No. 62/947,000 of Haramaty et al, filed 12 Dec. 2019, the disclosure of which is hereby incorporated herein by reference.

FIELD OF THE INVENTION

The present invention relates to systems and methods for frustrating counterfeiting of cables and related devices (termed herein "cables", without loss of generality), particularly but not exclusively for frustrating counterfeiting of cables intended for use with a host device such as a switch.

SUMMARY OF THE INVENTION

The present invention, in certain embodiments thereof, seeks to provide improved systems and methods for frustrating counterfeiting of cables.

There is thus provided in accordance with an exemplary embodiment of the present invention a device including a cable transceiver including cable electrical connections including data electrical connections and control electrical connections, and a hardware memory device, the hardware memory device storing a string identifying a cable and being electrically accessible from externally to the cable transceiver via the control electrical connections.

Further in accordance with an exemplary embodiment of the present invention the device also includes the cable in electrical connection with the cable electrical connections.

Still further in accordance with an exemplary embodiment of the present invention the string includes a hash value based, at least in part, on one or more of the following hashing parameters: a serial number of the cable, a data code associated with the cable, a physical attenuation of the cable, a date-time indicator of production of the cable, and physical attributes associated with the cable.

Additionally in accordance with an exemplary embodiment of the present invention the hash value includes a cryptographically-signed hash value.

Moreover in accordance with an exemplary embodiment of the present invention the device also includes a challenging-response module including one or more of the following: a microcontroller, a hardware security module (HSM), and a trusted platform module (TPM), Further in accordance with an exemplary embodiment of the present invention the challenge-response module is configured to receive, via the control electrical connections, a challenge originating externally to the device and to provide a response thereto.

Still further in accordance with an exemplary embodiment of the present invention the cable includes one of the following: an electrical cable, and an optical cable.

There is also provided in accordance with another exemplary embodiment of the present invention a device for verifying cable authenticity, the device including interface hardware for interfacing a plurality of cables with the device, and verifier circuitry configured to verify that each of the plurality of cables is genuine based on a string stored in a hardware memory device included in each of the plurality of cables.

Further in accordance with an exemplary embodiment of the present invention each of the plurality of cables includes one of the following: an electrical cable, and an optical cable.

Still further in accordance with an exemplary embodiment of the present invention each hardware memory device is disposed in a cable transceiver of each respective cable and is electrically accessible from externally to the cable transceiver via control electrical connections included in the cable transceiver.

Additionally in accordance with an exemplary embodiment of the present invention the string includes a hash value based, at least in part, on one or more of the following hashing parameters a serial number of the cable, a data code associated with the cable, a physical attenuation of the cable, a date-time indicator of production of the cable, and physical attributes associated with the cable.

Moreover in accordance with an exemplary embodiment of the present invention the hash value includes a cryptographically-signed hash value.

Further in accordance with an exemplary embodiment of the present invention the device also includes a verifying module adapted to send a challenge to a challenge-response module included in each of the plurality of cables and to evaluate correctness of a response received therefrom.

Still further in accordance with an exemplary embodiment of the present invention each challenge-response module includes one or more of the following: a microcontroller, a hardware security module (HSM), and a trusted platform module (TPM), and each challenge-response module is configured to receive the challenge and to provide the response.

Additionally in accordance with an exemplary embodiment of the present invention the verifier circuitry is implemented in one of the following: hardware, and a combination of hardware and software.

Further in accordance with an exemplary embodiment of the present invention the verifier circuitry is also configured to verify that no one of the plurality of cables stores the same string in the hardware memory device included therein as does any other one of the plurality of cables.

Still further in accordance with an exemplary embodiment of the present invention the verifier circuitry is configured to verify that no one of the plurality of cables stores a string in the hardware memory device included therein indicating a serial number which is the same as a serial number indicated by another string stored in the hardware memory device included in any other one of the plurality of cables.

Additionally in accordance with an exemplary embodiment of the present invention the device also includes verifier circuitry at a second device configured to verify that no one of a second plurality of cables interfacing with said second device stores a string in the hardware memory device comprised therein indicating a serial number which is the same as a serial number indicated by another string stored in the hardware memory device comprised in any other one of said second plurality of cables, and the verifier circuitry of the device and the verifier circuitry of the second device are in communication therebetween to verify that no one of said plurality of cables and said second plurality of cables, taken together, stores a string in the hardware memory device comprised therein indicating a serial number which is the same as a serial number indicated by another string stored in the hardware memory device comprised in any other one of said plurality of cables and said second plurality of cables, taken together.

Moreover in accordance with an exemplary embodiment of the present invention the string also includes a non-hashed value including one or more of the following non-hashing parameters: a serial number of the cable, a data code associated with the cable, a physical attenuation of the cable, a date-time indicator of production of the cable, and physical attributes associated with the cable, and the verifier circuitry is also configured to verify, for at least one of the non-hashing parameters and a corresponding one of the hashing parameters, that hashing the at least one of the non-hashing parameters according to a given hashing scheme produces the corresponding one of the hashing parameters.

There is also provided in accordance with another exemplary embodiment of the present invention a method for verifying cable authenticity, the method including using interface hardware to interface a plurality of cables with a device, and using verifier circuitry to verify that each of the plurality of cables is genuine based on a string stored in a hardware memory device included in each of the plurality of cables.

Further in accordance with an exemplary embodiment of the present invention each hardware memory device is disposed in a cable transceiver of each respective cable and is electrically accessible from externally to the cable transceiver via control electrical connections included in the cable transceiver.

Still further in accordance with an exemplary embodiment of the present invention the string includes a hash value based, at least in part, on one or more of the following hashing parameters: a serial number of the cable, a data code associated with the cable, a physical attenuation of the cable, a date-time indicator of production of the cable, and physical attributes associated with the cable.

Additionally in accordance with an exemplary embodiment of the present invention the method also includes using the verifier circuitry to verify that no one of the plurality of cables stores the same string in the hardware memory device included therein as does any other one of the plurality of cables.

Moreover in accordance with an exemplary embodiment of the present invention the method also includes using the verifier circuitry to verify that no one of the plurality of cables stores a string in the hardware memory device included therein indicating a serial number which is the same as a serial number indicated by another string stored in the hardware memory device included in any other one of the plurality of cables.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
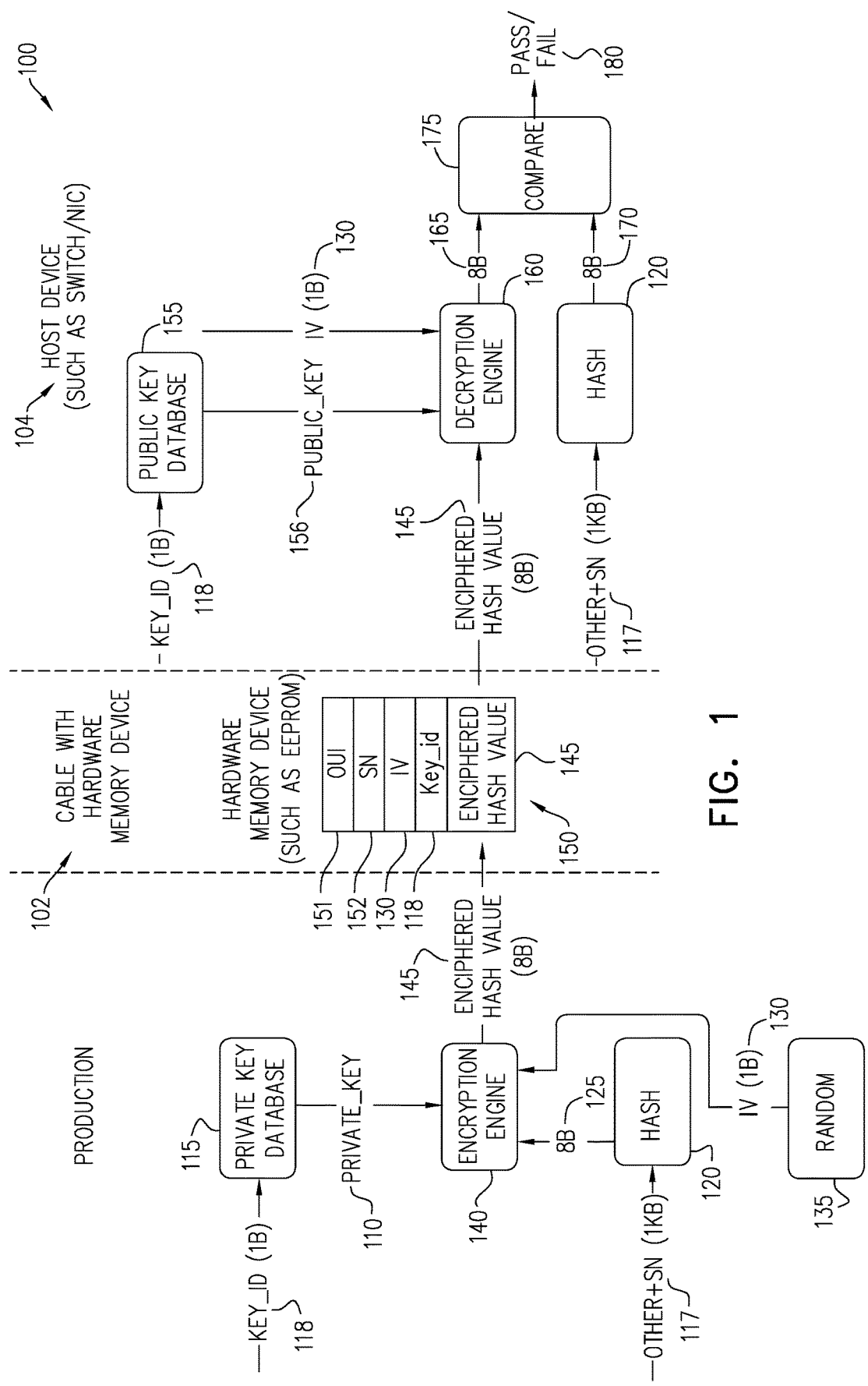
FIG. 1 is a simplified pictorial illustration of an exemplary system constructed and operative in accordance with an exemplary embodiment of the present invention.

In exemplary embodiments, the present invention seeks to provide improved systems and methods for detecting a counterfeit cable, and for frustrating counterfeiting of cables.

While the example of a cable is used herein, it is appreciated that a cable is a non-limiting example; in exemplary embodiments, the present invention could also apply to transceivers and to adapters, such as network adapters. Without loss of generality, throughout the present specification and claims the term "cable" (in its various grammatical forms) may be used to apply to cables, transceivers, and adapters, as described immediately above. In some cases, where the context calls for more specificity, specific terns such as "transceiver" and/or "adapter" in their various grammatical forms are used.

A counterfeit cable, without limiting the generality of the foregoing, may be a cable which is supposedly manufactured by a given manufacturer (associated with a given brand), but which was not actually manufactured by that manufacturer.

By way of non-limiting example, a cable may be identified by OUI (Organizationally Unique Identifier; see, for example, the discussion at en.wikipedia.org/wiki/Organizationally_unique_identifier). A counterfeit cable may thus be identified as being manufactured by manufacturer A, but in fact the cable was not manufactured by manufacturer A but rather by manufacturer B.

Some cables (which may be termed herein "active cables") include an embedded processor, generally in a transceiver located at an end of such cables.

The embedded processor may comprise a trusted platform module (TPM, such TPMs being known in the art), or another appropriate processor such as a hardware security module (HSM).

In general (not referring here specifically to cables) it is known in the art to use a TPM and/or an HSM to implement a challenge-response mechanism in order to verify authenticity of the TPM and/or the HSM, and thus to verify authenticity of a device in which the TPM and/or the HSM is comprised. Thus, an active cable, comprising a TPM and/or an HSM, may be able to participate in a challenge-response mechanism by receiving a challenge and providing a response. Such an active cable, appropriately configured and used, can provide a solution to the counterfeit cable problem described above. The well-known $I^2C$ mechanism may be used to query/challenge the TPM and/or the HSM (and similarly to query a memory device as described herein). Other appropriate alternatives to $I^2C$, such as (by way of non-limiting example) MDIO, may alternatively be used.

For passive cables, which do not include an embedded processor but which do include a passive memory device, it is believed to be relatively easy to "forge" the memory content (which content is also termed herein a "memory map") included in the memory device embedded in a given cable (typically but not necessarily, embedded as described above with reference to TPMs and HSMs, in a transceiver thereof), and thus to produce a counterfeit cable.

In passive cables having a passive memory device as described above, the memory content may be read by a host device which is in electrical connection with the (transceiver of) the passive cable. A host device may be any appropriate switch or any appropriate network interface card (NIC) or any other appropriate network device attached to the cable/transceiver or to an appropriate adapter (such as, without limiting the generality of the foregoing, a QSA (QSFP to SFP adapter)) attached to the cable. The cable/transceiver as described above (or, alternatively, the adapter) may comprise a memory device as described, which memory device comprises EPROM or any appropriate non-volatile memory (NVM), ROM, etc.

Generally speaking, the transceiver or adapter includes cable electrical connections adapted for connection to a host. The cable electrical connections, as is known in the art, comprise data electrical connections (through which data flows to/from the cable) and control electrical connections (used for control functions, generally from the host to the cable). In exemplary embodiments of the present invention, the host is configured and operative to access the memory content via the control electrical connections.

The memory map in the memory device may store information such as items in the following non-limiting illustrative list:
Vendor_OUI (Organizationally Unique Identifier);
Vendor name (TEXT, ASCII);
Vendor_PN (Part number);
Vendor_SN (Serial Number);
DateCode (which may comprise a date/time stamp indicating a date/time of manufacture); and
various other attributes associated with the cable in which the memory device is comprised, including, by way of non-limiting example, one or more of: receive (Rx) power; transmit (Tx) power; and other appropriate cable physical attributes etc.

The following is a particular non-limiting example of a counterfeit situation:
A counterfeit cable which was produced by vendor X but has vendor_OUI of vendor Y It will be appreciated from the above discussion that, as a result of counterfeit cables, Vendor X may lose revenue and may suffer damage to Vendor X's brand recognition.

Based on the above discussion, in at least certain exemplary embodiments of the present invention, the following problem is to be solved:
provide a way for a host to detect counterfeit cables. For cables/transceivers/adapters implementing CPU and firmware (active cables), this can be solved by asking "smart questions" (such as via a challenge/response protocol, as is known in the art). For cables/transceivers/adapters without such a CPU and firmware for implementing a challenge/response protocol (passive cables), it will be appreciated that, as described above, the counterfeiting vendor can copy the memory content; the inventors of the present invention believe that it would be desirable to overcome this problem. It is further appreciated that, in certain exemplary embodiments of the present invention, a memory device as described herein may be disposed in an active cable; such a cable is then configured and operative to carry out both operations using a challenge/response protocol, and also to participate in operations based on the memory device, as described herein.

As described above, a standard cable has a memory device which may include various data fields, including (by way of non-limiting example): vendor_OUI; and SN (Serial Number). In exemplary embodiments of the present invention, an enciphered serial number, an enciphered hash of a serial number, or another enciphered string (typically but not necessarily an enciphered hash of one or more parameters) is added to the memory map; alternatively, a hashed value without enciphering may be used.

The serial number or other value as described above may be ciphered either using an asymmetric or a symmetric encryption system, as are known in the art. Alternatively, the serial number may be hashed, preferably using a cryptographically sound hashing scheme, as is known in the art. In any case, only Vendor A will have the private key which is needed in order to generate a ciphered serial number; or only Vendor A will know how to carry out the cryptographically sound hashing scheme, which is generally based on a private key. Thus, counterfeit vendors cannot generate a proper ciphered or hashed serial number. It is particularly appreciated, as described above, that serial number is just one example of an appropriate datum, or appropriate data, which may be hashed/enciphered as described.

Vendor A devices (switches, NICs etc., as described above) will compare the serial number to the ciphered or hashed serial number. If symmetric encryption is used, then only Vendor A devices can check for correctness. If asymmetric encryption is used, then the public key (from the private key/public key pair) can be published, and any device can check whether the serial number matches the encrypted serial number. If cryptographically sound hashing is used, only those who have the relevant hash function (which may be only vendor A devices) can perform such a check. Persons skilled in the art will appreciate (as described above) that serial number is a particular non-limiting example; any appropriate parameter that is different between different cables would be useable in this context. By way of non-limiting example, a precise date and time of cable manufacture (such as a date/time including seconds) could be used, since presumably (for a sufficiently precise time) only one cable would be manufactured by a given manufacturer at that time.

A further problem may arise in that a counterfeit vendor (vendor B) may produce many cables with the same serial number, and in such a case simply copy the memory map from a single non-counterfeit cable with that serial number. (Again, the example of serial number given here is not limiting, as will be appreciated by the discussion immediately above). This scenario, while possible, may be a problem for the counterfeit vendor since their customers may dislike having all cables with a single serial number.

Furthermore, in order to overcome such a scenario, Vendor A switches may check that all ports are connected to a cable having a unique serial number. If any 2 ports have the same SN then we know that "there is at least one rotten apple". Note that it is assumed here that Vendor A makes both cables and hosts (host devices may, for example, comprise switches, NICs, etc., as described above), so that a Vendor A host would presumably be configured and operative to perform such a check. In a more complex scenario, a Vendor A host may need to check cables that the counterfeit vendor (vendor B) may generate with different serial numbers; for example, 1000 counterfeit cables with different serial numbers. However, Vendor A may still overcome this stratagem of the counterfeit Vendor B due to the "birthday paradox" or "balls in the bins" math:
For a case of d bins and n balls the approximate probability P of any bin having 2 or more balls is given by:

$$P=1-e^{(-n^2/(2d))}$$

For a discussion of the above, see Wikipedia:
en.wikipedia.org/wiki/Birthday_problem
Consider the following particular non-limiting example. For a switch with n=32 ports, where a counterfeit vendor has d=1000 different SNs:

$$P \text{ of 1 switch detection}=1-e^{(-32^2/(2*1000))}=40\%$$

And if there are, for example 24 switches which are able to communicate between themselves, $$P \text{ of detecting in any of the switches}=1-\hat{}(-((32*24)^2/(2*1000))=\sim1$$

Even with 10,000 SNs:

$$P \text{ of 1 switch detection}=1-e^{(-32^2/(2*10000))}=5\%$$

And if there are, for example 24 switches, $$P \text{ of detecting in any of the switches} = 1 - e^{(-((32*24)^2)/(2*10000))} = \sim 1$$

Furthermore, copying 10,000 cables from Vendor A is quite costly: The counterfeit vendor needs to buy 10,000 cables—so the counterfeit vendor could easily become known to vendor A. It also is significantly costly to buy 10,000 cables; this may cost, e.g. 10000*$50=$500,000.

Thus, in accordance with certain exemplary embodiments of the present invention, in order to defeat the above method that could be used by a counterfeit vendor, vendor A can proceed as follows:

Task of Vendor A Production
  Encrypt the (hashed) serial number (or other information as described above) and add the result to the cable memory.

Tasks of Vendor A Devices
  Decrypt (or perform other similar operations as described below, depending, by way of non-limiting example, on whether hashing followed by encryption was used in production) the stored result; in one non-limiting case, this produces the serial number.
  Compare the decrypted result to the serial number stored unencrypted in the memory device; if these two values differ, it is already clear that the cable is counterfeit.
  Check if any 2 ports have same serial number; if so, at least one of the cables having the same serial number is counterfeit.
  Referring to a hashing case as described above, consider an alternative exemplary embodiment in which the serial number is 16 bytes in size (16B), and there is not enough space in the memory device to add an additional 16B ciphered. In this case, an appropriate hash function can be applied to the serial number, producing (by way of non-limiting example) a 2B hash value which can be encrypted to a 2B enciphered value, so that only 2B need be added to the memory device. (Note that, in practice, by way of further non-limiting example, instead of a 2B hash value a 4B or 8B hash value may be used).

In certain exemplary embodiments, consider the following further enhancement:
  When the ciphered SN is short, then VendorB can try all combinations and in this way defeat the protection of the VendorA switch, eventually finding a legitimate enciphered value. A solution to this is for a VendorA switch to wait an appropriate time such as, for example, 10 seconds, before reporting that a counterfeit cable has been found.
  For example: if a "hacker" (or producer of counterfeit cables, or someone in league with such a producer) wants to test, for a given serial number, which cipher-text works, then with 2B of cipher text he has 2^46=about 65000 options. Now trying 65000 options where each takes 10 seconds takes 7.5 days, which would not be practical. Typically the VendorA switch could have found that the cipher-text is correct of incorrect within about 10 msec; therefore, in certain exemplary embodiments, the VendorA switch waits before responding, thus increasing the amount of time necessary to test all options.

Further details of exemplary embodiments of the present invention will be appreciated with reference to the following description; the following description will be best understood in light of the above discussion.

Reference is hereby made to FIG. 1, which is a simplified pictorial illustration of an exemplary system constructed and operative in accordance with an exemplary embodiment of the present invention. The exemplary system of FIG. 1 operates on the basis of a public key—private key system (as described above).

The system of FIG. 1, generally designated 100, illustrates production of a passive cable 102 in accordance with the above description, and use thereof with a host device 104, which may comprise an appropriate switch or NIC.

A private key 110 is retrieved from a private key database 115, based (in exemplary embodiments) on a Key_ID 118, which may be a 1 byte key ID.

Cable information 117 (which may include a cable serial number of length, for example, 1 kilobyte, and which may include other information such as, by way of non-limiting example, an OUI associated with a cable manufacturer) is input into a hashing device 120 which (using any appropriate hashing mechanism such as, for example, an appropriate cryptographically sound hashing mechanism, as is known in the art) produces therefrom a hash value 125, which may be (by way of non-limiting example) 8 bytes in length.

The hash value 125 and the private key 110 are input, along with an initialization value (IV) 130, which may be (by way of non-limiting example) of length 1 byte and which may be produced by a randomizer 135, into an encryption engine 140. The encryption engine 140 produces, from its inputs and using any appropriate encryption mechanism, an enciphered hash value 145. The enciphered hash value 145 is stored in a hardware memory device 150 (which may be instantiated in EEPROM or in any other appropriate technology) of the cable 102. Also stored in the hardware memory device 150 are the serial number 152 of the cable, the IV 130, and the Key_ID 118. Other information, such as (by way of non-limiting example) an OUI identifier 151 may also be stored in the hardware memory device 150; OUI identifiers are described above. Further non-limiting examples of information which may be stored include: a data code associated with the cable; a physical attenuation of the cable; a date-time indicator of production of the cable; and any appropriate physical attribute or attributes associated with the cable.

At the host system 104, the Key_ID 118, retrieved from the hardware memory device 150, is input into a public key database 155, the public key database 155 storing public keys corresponding to the private keys which are stored in the private key database 115. A corresponding public key 156 is then retrieved from the public key database 155; the public key 156 and the initialization value 130 are then input into a decryption engine 160. The decryption engine is configured to carry out a public key method on its inputs, as an inverse operation to that carried out by the encryption engine 140. The enciphered hash value 145 is also input into the decryption engine 160. A value 165 (shown, by way of particular non-limiting example as an 8 byte value) is output therefrom and is input into a comparator 175. The contents 170 of the hardware memory device 150 (or an appropriate subset thereof including the serial number 152) shown, by way of particular non-limiting example as a 1 k byte value 117, is input to a hashing device 120 (which may be identical to, and at least carries out identical operations as, the hashing device 120 described above). The output of the hashing device 120 is a hashed value 170 (shown, by way of particular non-limiting example, as an 8 byte value), which is also input into the comparator 175. If the two inputs to the comparator 175 are equal, this indicates that the cable 102 is genuine; if not equal, this indicates that the cable 102 is counterfeit. A genuineness indication of "pass/fail" 180 is output from the comparator accordingly.

Figure 2:
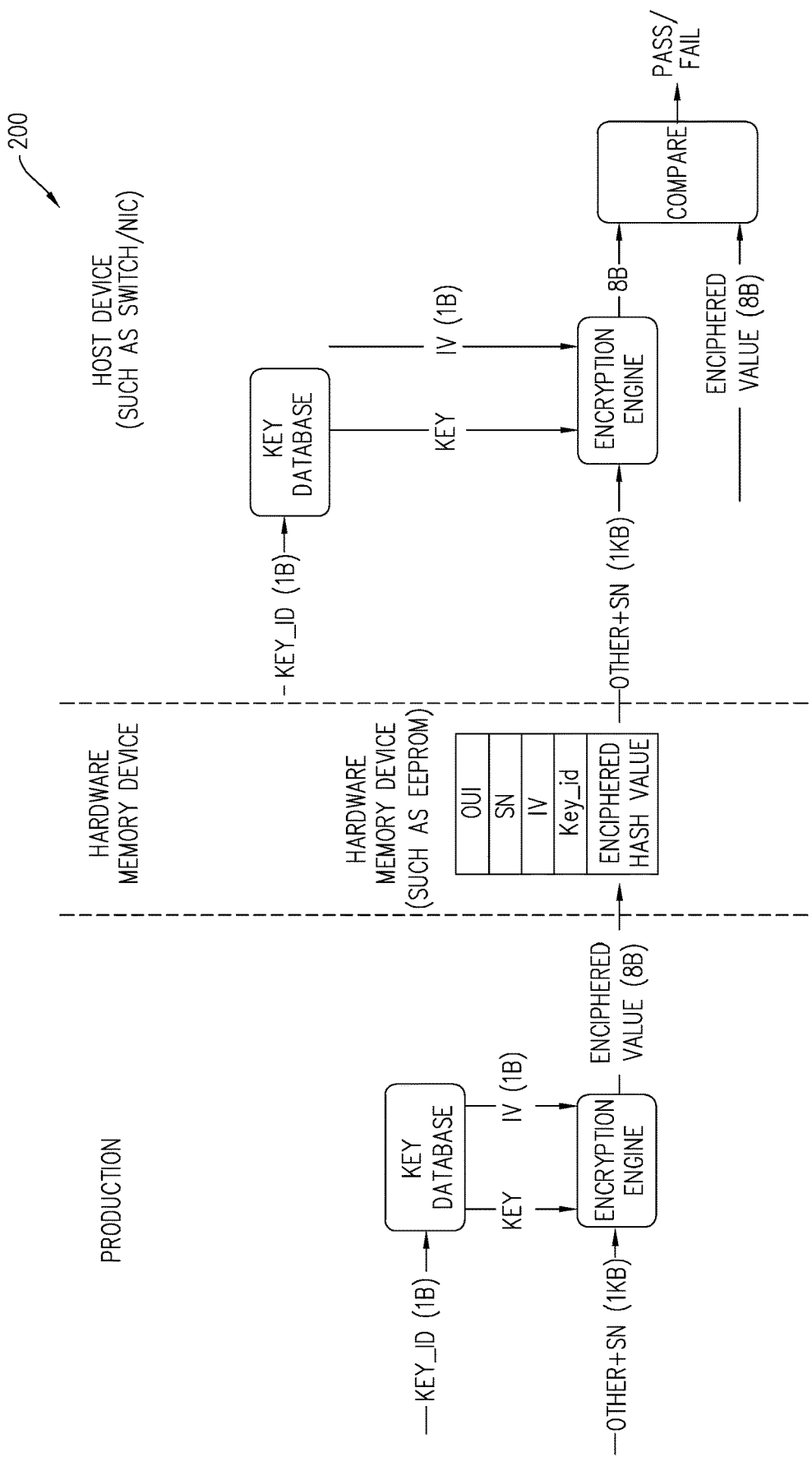
FIG. 2 is a simplified pictorial illustration of an exemplary system constructed and operative in accordance with another exemplary embodiment of the present invention.

Reference is hereby made to FIG. 2, which is a simplified pictorial illustration of an exemplary system constructed and operative in accordance with another exemplary embodiment of the present invention.

The system of FIG. 2, generally designated 200, is similar to the system of FIG. 1, except as described below.

In the system of FIG. 2, instead of using separate hashing as in the system of FIG. 1, encryption (based on a symmetric key with a secret database) is used without separate hashing. Given this difference, the system of FIG. 2 will be self-explanatory with reference to FIG. 1 and the description thereof. (It appreciated that it is also possible to consider the encryption, in this case, to be combined encryption and hashing).

Figure 3:
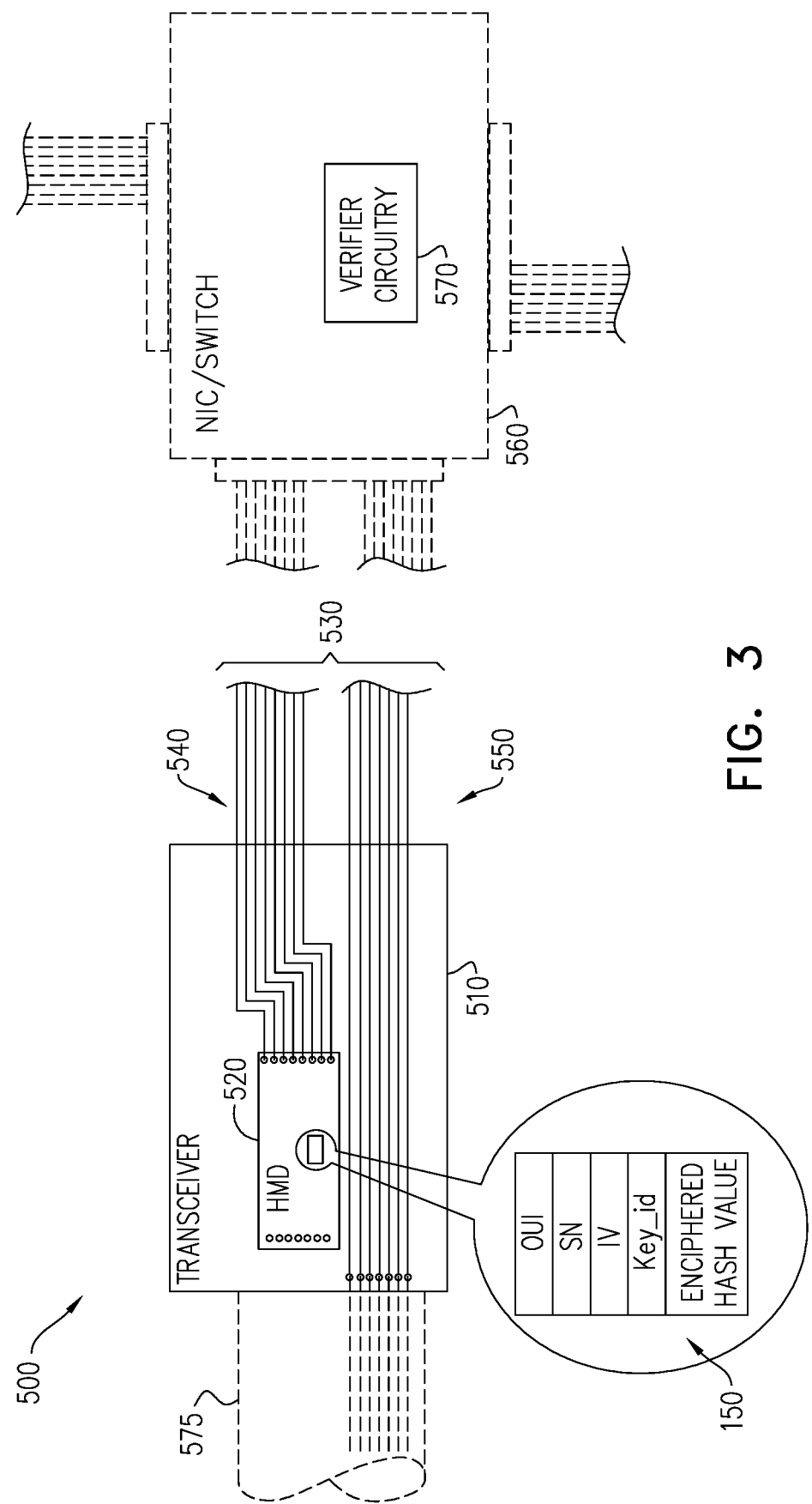
FIG. 3 is a simplified pictorial illustration of an exemplary system constructed and operative in accordance with another exemplary embodiment of the present invention.

Reference is hereby made to FIG. 3, which is a simplified pictorial illustration of an exemplary system constructed and operative in accordance with another exemplary embodiment of the present invention.

The system of FIG. 3, generally designated 500, has been depicted, for sake of simplicity of depiction and description, as corresponding to the system of FIG. 1. Persons skilled in the art will appreciate that other exemplary embodiments, similar to that of FIG. 3 but corresponding to the systems of FIG. 2, may be provided, mutatis mutandis, based on the depiction and description of FIG. 3.

The system of FIG. 3 comprises a transceiver 510 which (except as otherwise described below) may be similar to known transceivers used for connecting cables (which generally carry analog signals) to associated devices (which generally carry digital signals). Such associated devices are also termed herein "host devices" and/or "host systems".

The transceiver 510 comprises a hardware memory device 520, which may be similar in structure and function to the passive memory device described above with reference to passive cables, and to the hardware memory device 150 of FIG. 1. The hardware memory device 520 is shown storing data which is similar to the data stored in the hardware memory device 150 of FIG. 1; persons skilled in the art will therefore appreciate that the transceiver 510 with the hardware memory device 520 comprised therein may function in the manner described above with reference to FIG. 1 (and, mutatis mutandis, in the manner described above with reference to FIG. 2).

The transceiver 510 comprises cable electrical connections 530, which in turn comprise control electrical connections 540 and data electrical connections 550. The cable electrical connections 530 comprising the control electrical connections 540 and the data electrical connections 550 are configured to be connected via any suitable connection to a host device or host system. By way of non-limiting example, such a host device/system is shown in FIG. 3 as a network interface controller (NIC) or switch 560, it being appreciated that other suitable host devices may be used. By way of non-limiting example, a suitable CPU or a suitable GPU (graphics processing unit) or a suitable DPU (data processing unit) may be used instead of or may be comprised in the NIC/switch 560. By way of particular non-limiting example, an NVIDIA Mellanox BlueField®-2 DPU, commercially available (for example) from Mellanox Technologies Inc. may be used.

The NIC/switch 560 comprises verifier circuitry 570, which may carry out functions similar to those described above with reference to the host device 104 of FIG. 1 and, mutatis mutandis to functions described above with reference to FIG. 2. The verifier circuitry 570 may be implemented in a suitable CPU or a suitable GPU or a suitable DPU as explained above.

The transceiver 510 is shown attached to a cable 575, which may comprise any suitable cable, it being appreciated that the cable 575 and the transceiver 510 would be chosen to be interoperable. By way of particular non-limiting example, if the cable 575 comprises an optical cable, then the transceiver 510 would comprise a suitable optical transceiver. By way of another particular non-limiting example, if the cable 575 comprises a particular kind of electrical cable, then the transceiver 510 would comprise a suitable electrical transceiver.

As depicted in FIG. 3, the NIC/switch 560 may also be capable of being simultaneously connected to a plurality of other cables, enabling scenarios as described above in which a plurality of counterfeit cables are connected, with at least two of such cables having the same serial number. In addition, a plurality of NICs/switches 560 may be in operative communication therebetween (as is known in the art), enabling scenarios as described above in which a plurality of switches may communicate in order to discover counterfeit cables at least two of which have the same serial number, even if those cables are connected to different switches.

It is appreciated that a subcombination of the system of FIG. 3 without the NIC/switch 560 comprises an alternative exemplary embodiment of the present invention. Similarly, a subcombination of the system of FIG. 3 comprising the NIC/switch 560 without the other elements of the system of FIG. 3 may also comprise an alternative exemplary embodiment of the present invention. Other such subcombinations include:

the transceiver 510 without the other elements of the system of FIG. 3; and the transceiver 510 and the cable 575, without the other elements of the system of FIG. 3.

Returning to a description of the control electrical connections 540 and the data electrical connections 550, similar electrical connections are (except as described below) known in the art. In general, control electrical connections carry control signals from a host system to a cable and receive responses thereto, while data electrical connections carry data to/from a cable.

In the exemplary embodiment of FIG. 3, the control electrical connections 540 are shown as passing to the transceiver 510 via the hardware memory device 520. In this way, the operations described above with reference to FIG. 1 (and, mutatis mutandis, with reference to FIG. 2) may be carried out.

It is appreciated that, without limiting the generality of the foregoing, communications over the control electrical connections may take place using I²C, MDIO, or any other appropriate mechanism, as described above.

It is appreciated that (in accordance with the above description) the transceiver 510 may also comprise a challenge-response module (not shown), which in turn may comprise one more of the following: an appropriate microcontroller; a trusted platform module (TPM); and a hardware security module (HSM), as are known in the art. Again, as described above, a TPM and/or an HSM may implement a challenge-response mechanism in order to verify authenticity of the TPM and/or the HSM, and thus to verify authenticity of a device in which the TPM and/or the HSM is comprised. Thus, an active cable (as described above), comprising a TPM and/or an HSM, may be able to participate in a challenge-response mechanism by receiving a challenge and providing a response. Such an active cable, appropriately configured and used, can provide a solution to the counterfeit cable problem described above. It is appreciated that such a challenge-response module may be employed in addition to the hardware memory device 520, thus providing an additional mechanism for verifying cable authenticity.

Figure 4:
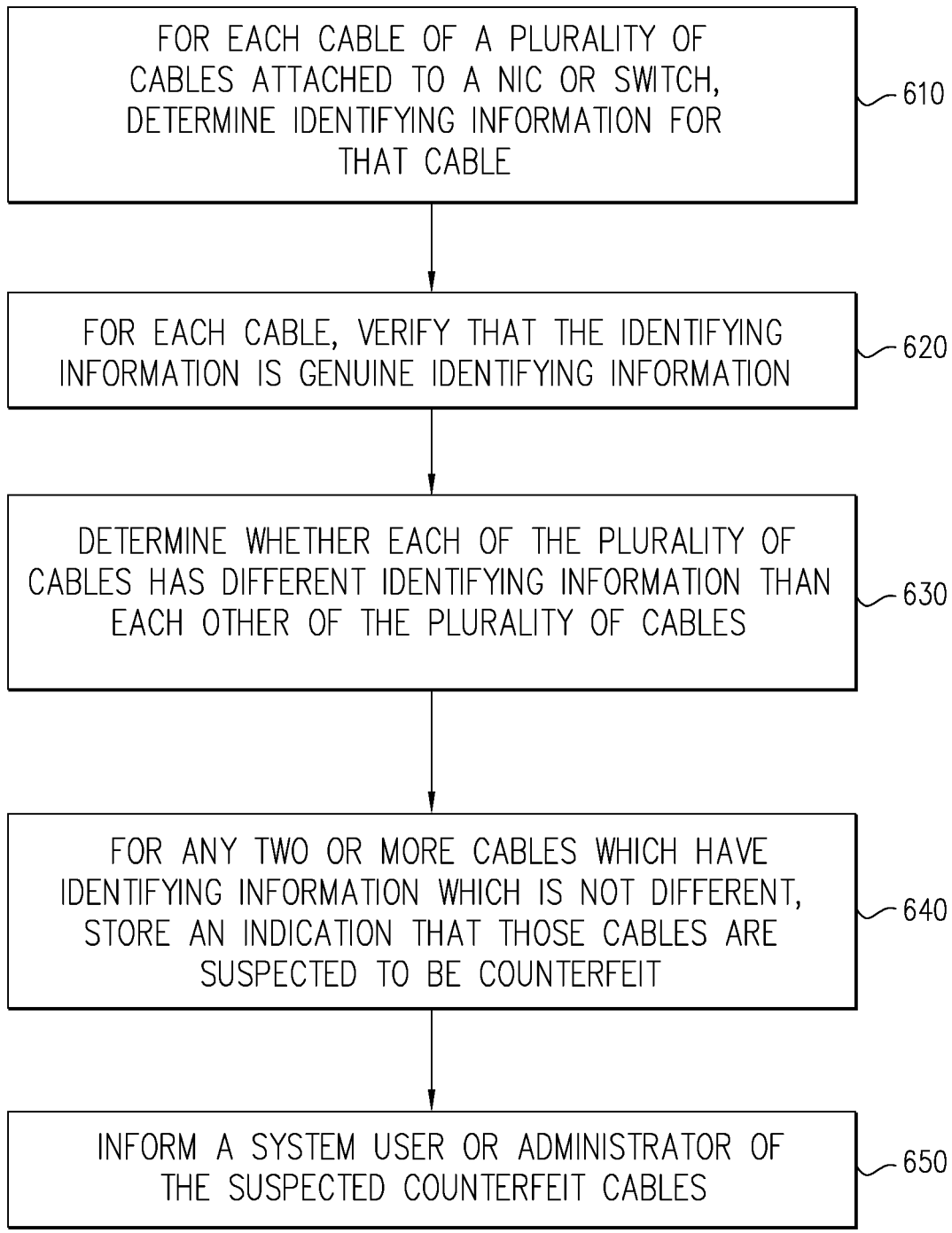
FIG. 4 is a simplified flowchart illustration of an exemplary method of operation of the system of FIG. 3, showing operation in a mode designed to frustrate use of counterfeit cables when working with a plurality of cables.

Reference is now additionally made to FIG. 4, which is a simplified flowchart illustration of an exemplary method of operation of the system of FIG. 3, showing operation in a mode designed to frustrate use of counterfeit cables when working with a plurality of cables. The method of FIG. 4, as depicted, comprises the following steps, it being appreciated that some steps may be omitted or their order modified in certain exemplary modes of operation:

For each cable of a plurality of cables attached to a NIC or to a switch (or other appropriate device), determine identifying information for that cable (step 610). Exemplary methods of determination of identifying information are described above, inter alia with reference to FIG. 1.

For each cable, verify that the identifying information is genuine identifying information (step 620); again, relevant exemplary methods for carrying out step 620 are described above, inter alia with reference to FIG. 1.

Determine whether each of the plurality of cables has different identifying information than each other of the plurality of cables (step 630). For any two or more cables which have identifying information which is not different, store an indication that those cables are suspected to be counterfeit (step 640). A system user or administrator of the suspected counterfeit cables is then informed of the suspected counterfeit cables (step 650). In particular with regard to steps 640 and 650, it is appreciated that other alternatives are available, such as: not storing the information, but rather immediately notifying a system user or administrator; storing the information, and only notifying a system user or administrator on request or periodically; and sending the information to a remote location, whether with or without previously storing the information.

For a better understanding of a motivation behind steps 630, 640, and 650, see the discussion above of the "birthday problem" or "birthday paradox".

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. An apparatus for verifying cable authenticity, wherein a manufacturer stores unique individual identifying strings in hardware memory devices attached to cables that the manufacture makes, wherein each manufactured cable indicates a different identifying string, and each identifying string includes a unique hash value, the apparatus comprising:
    a hardware interface for connection by a plurality of cables to a communication network; and
    verifier circuitry to read respective strings from respective hardware memory devices in the cables that are connected to the hardware interface, and to generate an indication that at least one of the cables is counterfeit upon detecting that two or more of the strings of different cables are the same.

2. The apparatus according to claim 1, wherein each of the cables comprises one of the following: an electrical cable; and an optical cable.

3. The apparatus according to claim 1, wherein the hardware memory devices are disposed in cable transceivers in the respective cables and are electrically accessed by the verifier circuitry via control electrical connections in the cable transceivers.

4. The apparatus according to claim 1, wherein the hash values are based, at least in part, on one or more of the following hashing parameters in each cable: a serial number of the cable; a data code associated with the cable; a physical attenuation of the cable; a date-time indicator of production of the cable; and physical attributes associated with the cable.

5. The apparatus according to claim 4, wherein the hash values are cryptographically signed.

6. The apparatus according to claim 4, wherein the verifier circuitry is to send a challenge to a challenge-response module comprised in each of the cables and to evaluate correctness of a response received therefrom.

7. The apparatus according to claim 4, wherein the strings also comprise non-hashed values, and wherein the verifier circuitry is to compute a hash over at least one of the non-hashed values to generate a hash result and to verify that the hash result matches at least one of the hash values stored in each of the cables that are connected to the ports.

8. The apparatus according to claim 1, wherein the respective strings indicate respective serial numbers of the cables, and wherein the verifier circuitry is to generate the indication that at least one of the cables is counterfeit upon detecting that two or more of the serial numbers are the same.

9. A communication system comprising multiple apparatuses according to claim 1, wherein the verifier circuitry in at least one of the apparatuses is to communicate with the verifier circuitry in other apparatuses via the network to make a comparison between the respective strings read from the respective cables connected to the hardware interface of the at least one of the apparatuses to the respective strings read from the respective cables connected to the hardware interfaces of the other apparatuses and to generate the indication that at least one of the cables is counterfeit responsively to the comparison.

10. A method for verifying cable authenticity, wherein a manufacturer stores unique individual identifying strings in hardware memory devices attached to cables that the manufacture makes, wherein each manufactured cable indicates a different identifying string, and each identifying string includes a unique hash value, the method comprising:
    connecting a plurality of cables to a communication network via a hardware interface;
    reading, respective strings from respective hardware memory devices in the cables that are connected to the hardware interface; and generating an indication that at least one of the cables is counterfeit upon detecting that two or more of the strings of different cables are the same.

11. The method according to claim 10, wherein each of the cables comprises one of the following: an electrical cable; and an optical cable.

12. The method according to claim 10, wherein the hardware memory devices are disposed in cable transceivers in the respective cables, and wherein reading the respective strings comprises accessing the hardware memory devices via control electrical connections in the cable transceivers.

13. The method according to claim 10, wherein the hash values are based, at least in part, on one or more of the following hashing parameters in each cable: a serial number of the cable; a data code associated with the cable; a physical attenuation of the cable; a date-time indicator of production of the cable; and physical attributes associated with the cable.

14. The method according to claim 13, wherein the hash values are cryptographically signed.

15. The method according to claim 13, and comprising sending a challenge from the communication apparatus to a challenge-response module comprised in each of the cables and to evaluate correctness of a response received therefrom.

16. The method according to claim 13, wherein the strings also comprise non-hashed values, and wherein the method comprises computing a hash in the apparatus over at least one of the non-hashed values to generate a hash result, and verifying that the hash result matches at least one of the hash values stored in each of the cables that are connected to the ports.

17. The method according to claim 10, wherein the respective strings indicate respective serial numbers of the cables, and wherein generating the indication comprises determining that at least one of the cables is counterfeit upon detecting that two or more of the serial numbers are the same.

18. The method according to claim 10, and comprising computing with other apparatuses via the network to make a comparison between the respective strings read from the respective cables connected to the hardware interface of the communication apparatus to the respective strings read from the respective cables connected to the hardware interfaces of the other apparatuses, and generating the indication that at least one of the cables is counterfeit responsively to the comparison.

* * * * *